A. N. ANDERSEN.
PEELING MACHINE FOR WOOD LOGS.
APPLICATION FILED MAR. 29, 1913.
1,106,177.
Patented Aug. 4, 1914.
2 SHEETS—SHEET 1.
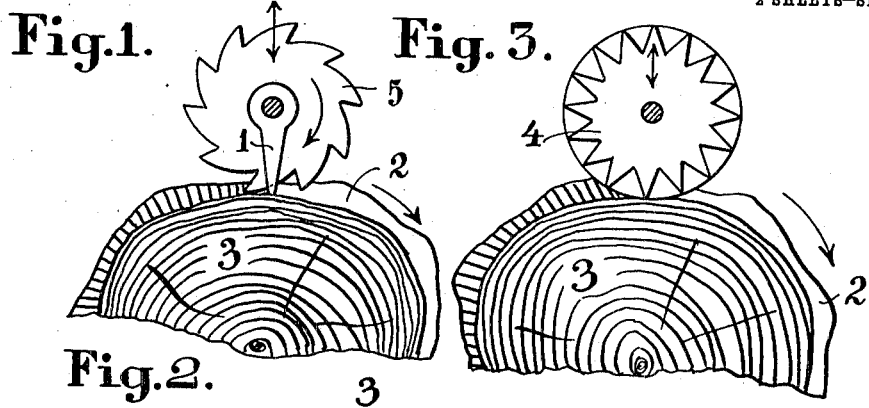
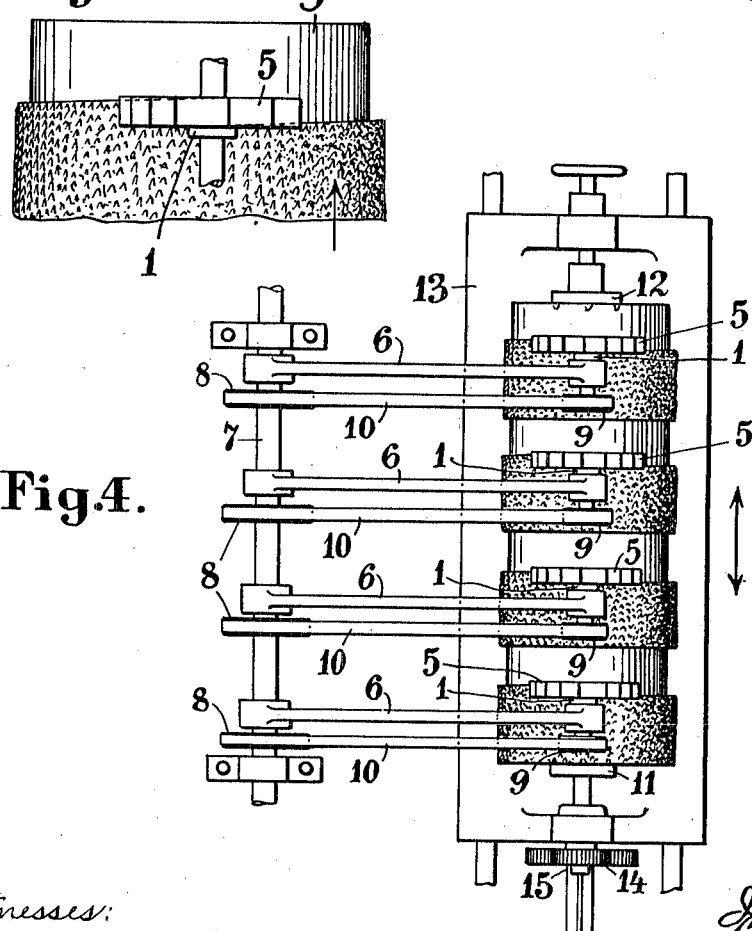

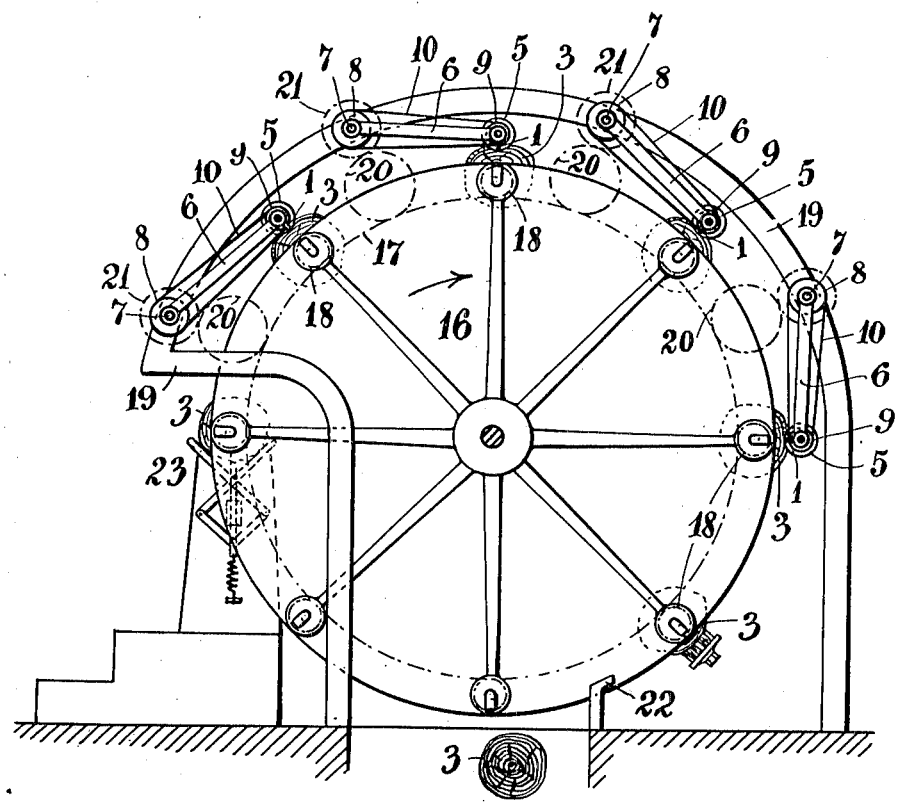

UNITED STATES PATENT OFFICE.

ANDERS NICOLAY ANDERSEN, OF HOUGSUND, NORWAY.

PEELING-MACHINE FOR WOOD LOGS.

1,106,177.  Specification of Letters Patent.  Patented Aug. 4, 1914.

Application filed March 29, 1913. Serial No. 757,590.

*To all whom it may concern:*

Be it known that I, ANDERS NICOLAY ANDERSEN, a subject of the King of Norway, residing at Hougsund, Eker, Norway, have invented certain new and useful Improvements in Peeling-Machines for Wood Logs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in log peeling machines of that class wherein a rotating cutter is used for peeling the bark from the log.

The object of the invention is to provide a peeling machine which will only remove the bark so that no wood is wasted.

The invention consists in providing a plurality of cutters comprising thin rotatable disks which are movable independently of each other and radially to the log so as to remove all the bark even when the latter is of different thickness on different parts of the log.

Each cutter is provided with a knife which is capable of cutting only through the bark which is softer than the wood, thus keeping the cutter, which is capable of cutting the wood, out of contact with the latter.

In order that the invention may be clearly understood I will describe the preferred forms with reference to the accompanying drawings, wherein—

Figure 1 is a diagrammatic sectional elevation of one form of cutting device. Fig. 2 is a plan view thereof. Fig. 3 is an elevation of a modified form of cutter. Fig. 4 is a plan view of a rossing or peeling machine embodying the invention. Fig. 5 is an elevation of another form of machine.

The cutter, as indicated by the arrows in Fig. 1, is movable up and down, and comprises a non-rotatable knife 1, which is only capable of penetrating the bark 2, so as to determine the depth of cut of the cutter 5, which is rotated in a direction opposite to that of the log 3 as indicated by the arrows.

A serrated disk 4, shown in Fig. 3 may be substituted for the knife, and as the teeth of the disk are incapable of penetrating the hard wood, the rotating cutter cannot cut below the bark.

In the embodiment shown in Fig. 4 of the machine provided with the cutter device according to the invention, the cutters 5 are mounted on spindles journaled in the free ends of arms 6 which are pivoted on a shaft 7, said cutters being pressed against the log 3 by their own weight and that of the arms 6 or by the action of springs, not shown. The shaft 7 is rotated by any suitable driving means, the rotation of the shaft being transmitted to the cutters 5 by pulleys 8 on the shaft 7 and pulleys 9 on the spindles connected by drive belts 10. The log 3 is fixed between chucks 11, 12, mounted on a movable slide 13 and rotated by means of a slidable gearing 14 driven from a shaft 15. The slide 13 is moved in the usual manner by a spindle, not shown, a screw motion being thus imparted to the log, which motion is so proportioned to the breadth of the cutters 5 that during one revolution, the log is fed a distance equal to the breadth of a cutter.

In the embodiment shown in Fig. 5 the logs 3 are secured by means of chucks and the like, on the circumference of a rotating wheel 16, and rotated by gearings 17, 18. The shaft 7, arms 6, cutters 5, knives 1, and driving devices 8, 9, 10, the same as those previously described and shown in Fig. 4, are mounted on a fixed frame 19 and operated through gearing 20, 21 indicated in dotted lines. The successive cutters 5 are spaced apart laterally the breadth of a cutter the machine being so constructed that the log will be completely peeled of its bark by the combined action of all the cutters.

The machine may in a known manner be provided with an automatic ejector 22 and an automatic device 23 for placing the logs in position in the machine.

I claim—

1. In a peeling machine for removing the bark from logs and the like, the combination of a rotating cutter having an independent movement radially to the log, a knife carried by the cutter holder and adapted to cut through the bark of the log to determine the depth of cut of the cutter.

2. In a peeling machine for removing the bark from logs and the like, rotating disk cutters free to move independently of each other radially to the log, and a knife on each of said cutters adapted to cut only through the bark of the log to determine the depth of cut of the cutter.

3. In a peeling machine for removing the bark from logs and the like, the combination of a rotating cutter having an independent movement radially to the log, a knife consisting of a rotating toothed or pointed disk, the teeth or points of the disk being adapted to cut only through the bark of the log to determine the depth of cut of the cutter.

4. In a peeling machine for removing the bark from logs and the like, the combination of a rotatable cutter having an independent movement radially to the wood log, a knife adapted to cut through the bark of the log to determine the depth of cut of the cutter, and means for simultaneously imparting to the wood log a rotating and a longitudinal movement whereby the cutter is caused to peel off the bark along a helical curve.

In testimony that I claim the foregoing as my invention, I have signed my name in presence of two subscribing witnesses.

ANDERS NICOLAY ANDERSEN.

Witnesses:
M. E. GUTTORENSEN,
RUTH LINDSTRÖM.